Figure 1:
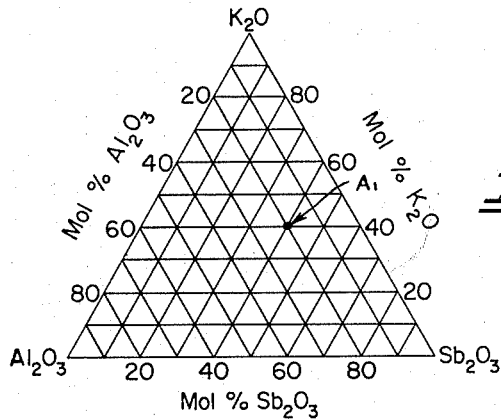

Dec. 22, 1959    B. W. KING. JR., ET AL    2,918,382
ANTIMONY OXIDE GLASS
Filed May 18, 1955    2 Sheets-Sheet 1

INVENTOR.
Burnham W. King
Walter A. Hedden
BY
Gray, Mase and Dunson
ATTORNEYS.

Dec. 22, 1959   B. W. KING, JR., ET AL   2,918,382
ANTIMONY OXIDE GLASS

Filed May 18, 1955   2 Sheets-Sheet 2

INVENTOR.
Burnham W. King
Walter A. Hedden
BY
ATTORNEYS.

United States Patent Office 2,918,382
Patented Dec. 22, 1959

2,918,382
ANTIMONY OXIDE GLASS

Burnham W. King, Jr., Columbus, and Walter A. Hedden, Worthington, Ohio, assignors, by mesne assignments, to Bradley Mining Company, San Francisco, Calif., a corporation of California Application May 18, 1955, Serial No. 509,151

8 Claims. (Cl. 106—47)

This invention relates to glass compositions having an oxide of antimony as the primary constituent.

Silica and silicate glasses are comparatively inexpensive to manufacture and have satisfactory light-transmission characteristics in the visible range. These glasses are substantially opaque to infrared rays longer than about 3.5 microns, and so are not suited for uses where transmission of infrared rays beyond this wave length is required.

Glass compositions having arsenic trisulfide as the predominant constituent have been developed for use especially where infrared transmission is required. These glasses are relatively expensive to manufacture and present dangers to workmen engaged in their manufacture by reason of the toxicity of the arsenic, although they have good infrared transmission.

It is an object of the present invention to form a glass which has good infrared transmission characteristics and at the same time is relatively economical to manufacture and less toxic to workmen than glasses containing arsenic compounds.

A further object of the present invention is to form a glass with antimony oxide as the predominant constituent and substantially free of silica and boron trioxide.

These and other objects will appear in the disclosure which follows.

According to the present invention there is provided a novel transparent glass composition which transmits infrared radiation of wave lengths up to about 6 microns, having antimony oxide as its principal constituent and also containing alumina and either potassium oxide, sodium oxide, or both. No other ingredients are ordinarily present except for small amounts of metallic oxides which may be added in some cases to impart desired colors to the glass.

In the drawings:

Figs. 1 to 4, inclusive, are triaxial diagrams showing the operative limits of glass compositions having mol ratios of potassium oxide to total alkali metal oxide of 1, 0.75, 0.50, and 0, respectively, according to the present invention. Fig. 1a is an enlarged view of the area $A_1$ of Fig. 1.

Figure 5:
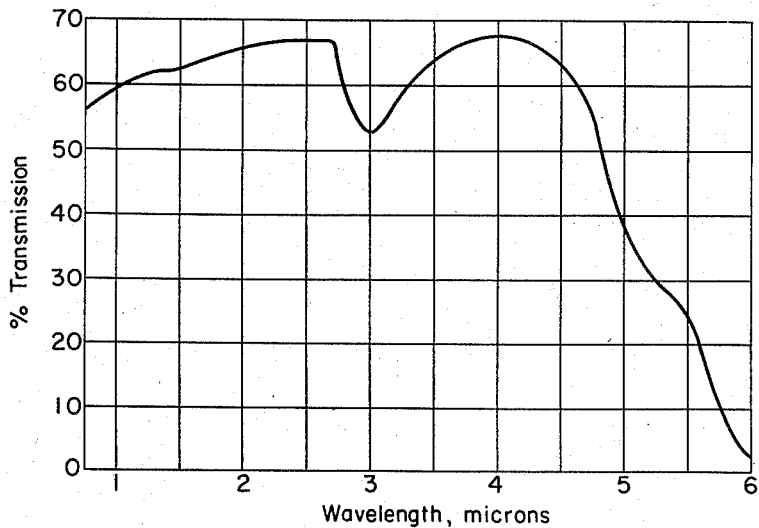

Fig. 5 is a light transmission curve of a glass according to the present invention in the wave length range of 0.5 to 6 microns.

Glass compositions according to the present invention are transparent amorphous compositions consisting essentially of antimony oxides, alumina, and at least one alkali metal oxide chosen from the group consisting of sodium oxide and potassium oxide. The exact limits of suitable compositions according to the present invention are somewhat irregular. In all of these compositions, the amount of antimony oxides lie within the range of about 25 to about 55 mol percent of the total composition. The antimony oxides are antimony trioxide and/or higher oxides of antimony. Alumina constitutes from about 13 to about 30 mol percent of the total. The remainder consists of sodium oxide, potassium oxide, or preferably a mixture of the two. The total alkali metal oxide content is from about 27 to about 45 mol percent of the total composition, and is greater than the alumina content on the mol percentage basis. On the basis of weight percentage, this corresponds to about 52 to about 80 percent by weight of antimony oxides reported as the equivalent weight of antimony trioxide, about 7 to about 22 percent by weight of alumina, and about 12 to about 26 percent by weight of alkali metal oxide.

Compositions lying outside the operative range according to the present invention lack sufficient transparency to be suitable for transmission of infrared radiation, and in many cases are entirely opaque. Some of these compositions are heterogeneous mixtures of transparent glass and crystalline material. Other compositions, particularly those having alumina contents slightly higher than the range according to this invention, are opaque although entirely vitreous. These compositions in general lie close to the border of operative compositions according to this invention. Still other compositions of antimony oxides, alumina, and sodium and potassium oxides in proportions greatly different from the proportions according to this invention, are entirely or largely crystalline.

The operative range of glass compositions according to this invention is shown in Figs. 1 to 4, inclusive. These figures are triaxial diagrams showing the range in contents of alkali metal oxides, alumina, and antimony oxides in glasses having various ratios of potassium oxide to total alkali metal oxides. In each diagram the apices represent 100 percent of alkali metal oxides, alumina, and antimony oxides, respectively, and the sides show mol percentages of these constituents. The designation $R_2O$ is used to refer to the total alkali metal oxide content, which is the combined amount of $Na_2O$ and $K_2O$. Alumina is designated as $Al_2O_3$. The entire content of antimony oxides is designated as $Sb_2O_3$, although it is to be understood that this includes either antimony trioxide, higher oxides of antimony, or both.

Figure 1A:
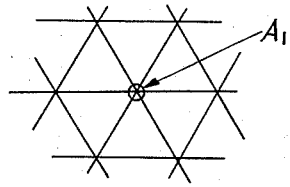
Figure 2:
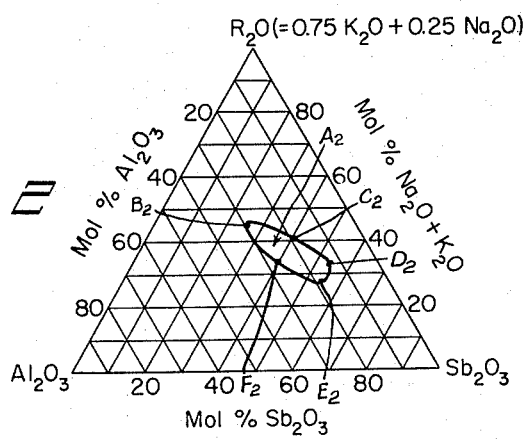
Figure 3:
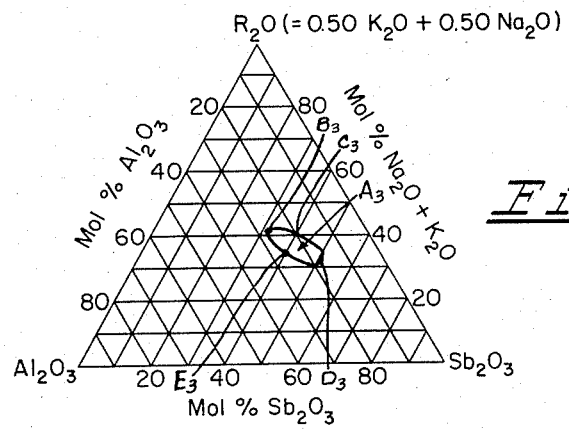
Figure 4:
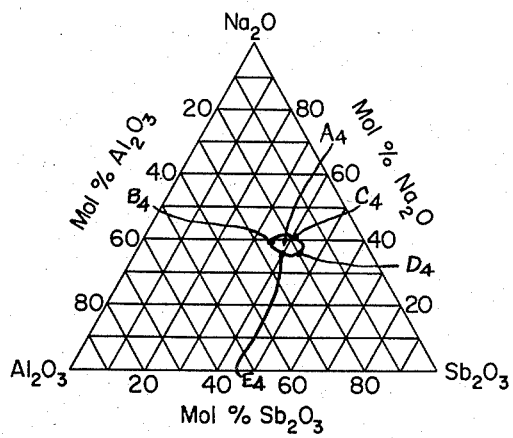

Fig. 1 shows the operative composition range in glasses having $K_2O$ as the only alkali metal oxide, and the apices are designated $K_2O$, $Al_2O_3$, and $Sb_2O_3$, respectively. Figs. 2 and 3 show the range when the mol ratio of $K_2O$ to $Na_2O+K_2O(R_2O)$ is 0.75 and 0.50, respectively. Fig. 4 shows the operative ranges in glasses containing $Na_2O$ as the only alkali metal oxide, and the apices are designated respectively as $Na_2O$, $Al_2O_3$, and $Sb_2O_3$. In each of these figures the curved line denotes the limits of transparent glass compositions. For proportions of $K_2O$ to $Na_2O$, not shown in the drawings, the limits of transparent glass compositions can be estimated from the drawings by interpolation.

Comparison of Figs. 1 through 4 shows that the operative range of antimony oxides is broadest in glasses in which the mol ratio of $K_2O$ to total alkali metal oxides $(R_2O)$ is 0.75. The range is very limited in glasses containing no $Na_2O$ (Fig. 1), broadens to a maximum as the ratio of $K_2O$ to $K_2O+Na_2O$ drops to 0.75 (Fig. 2) and thereafter drops gradually (Figs. 3 and 4) as the mol ratio of $K_2O$ to total alkali metal oxides drops to zero.

Fig. 2 shows that the antimony oxide content in glasses containing 3 mols of $K_2O$ per mol of $Na_2O$ $(K_2O/R_2O=0.75)$ may be varied from 25 to 55 mol percent. This corresponds to 52 to 80 percent by weight, and represents a greater range than is permissible in glasses having any other proportions of $Na_2O$ and $K_2O$ according to this invention. The composition range of glasses containing 3 mols of $K_2O$ per mol of $Na_2O$ is denoted by the area $A_2$ enclosed within the curved line in Fig. 2. The total alkali metal oxide content is from 27 to 45 mol percent. Alumina constitutes the balance and amounts to 13 to 30 mol percent of the composition. The combined mol percentage of alkali oxides always exceeds the mol percentage of alumina. The maximum amounts of alkali oxides and alumina, and the minimum amount of antimony oxides are present in a glass containing 25 mol percent antimony oxides, 45 mol percent alkali metal oxides (about 11.2 mol percent $Na_2O$ and 33.8 mol percent $K_2O$) and 30 mol percent alumina. This composition is denoted by point $B_2$ in Fig. 2. The minimum amount of alkali metal oxides is 27 mol percent in a glass also containing about 20 mol percent alumina and 53 mol percent antimony oxides. This composition is denoted by point $E_2$. The minimum amount of alumina, 13 mol percent, occurs in a glass also containing about 34 mol percent of alkali metal oxides and 53 mol percent of antimony oxides. The composition is denoted by point $D_2$. In a glass containing 40 mol percent antimony oxides, the alkali metal oxide content may vary from about 34 to 41 mol percent, and the balance is essentially alumina. These compositions are denoted by points $F_2$ and $C_2$, respectively.

As the mol ratio of $K_2O$ to $Na_2O$ decreases below 3 to 1, the breadth of range of antimony oxide contents also decreases. The area $A_3$ within the curved line of Fig. 3 represents the range of composition in glasses according to the present invention which contain equimolar amounts of $Na_2O$ and $K_2O$.

The amount of antimony oxides is in the range of about 30 to 50 mol percent when equimolar amounts of $Na_2O$ to $K_2O$ are present, as shown in Fig. 3. These amounts are denoted by points $B_3$ and $D_3$, respectively. Point $C_3$ represents a composition containing approximately 41 mol percent of alkali metal oxides, 19 mol percent alumina, and 40 mol percent antimony oxide. Point $E_3$ represents a composition containing approximately 34 mol percent alkali metal oxides, 26 mol percent alumina, and 40 mol percent antimony oxide. The range of antimony oxide contents narrows considerably with further decreases in the ratio $K_2O$ to $Na_2O$. When sodium oxide is the only metal oxide present, the antimony oxide content should lie in the range of about 36 to 46 mol percent, as shown in Fig. 4. The area $A_4$ within the curved line of Fig. 4 represents the operative range of glass compositions according to this invention consisting of $Na_2O$, $Al_2O_3$, and antimony oxides, with no $K_2O$. Points $B_4$ and $D_4$ denote glasses containing the minimum and maximum antimony oxide contents, respectively. Point $C_4$ represents a composition of about 41 mol percent $Na_2O$, 19 mol percent alumina, and 40 mol percent antimony oxide. Point $E_4$ represents a composition of 34 mol percent $Na_2O$, 26 mol percent alumina, and 40 mol percent antimony oxide.

The median antimony oxide content is about 40 mol percent, regardless of the relative amounts of $Na_2O$ and $K_2O$ in the glass. The permissible range in alkali metal oxide and alumina contents in glasses containing 40 mol percent antimony oxides, is virtually constant at 34 to 41 mol percent alkali metal oxides, balance alumina, at any ratio of $K_2O$ to total alkali metal oxides up to a mol fraction of 0.75.

Increases in the molar ratio of $K_2O$ to $Na_2O$ above 3 to 1 greatly reduce the range of operative amounts of the various ingredients. Fig. 1 shows that the only suitable glasses containing no $Na_2O$ are compositions of about 40 mol percent $K_2O$, 20 mol percent $Al_2O_3$, and 40 mol percent antimony oxides. These compositions lie within the very small area $A_1$ enclosed by the curved line of Fig. 1. Even these compositions are more difficult to melt into a transparent glass than most compositions according to this invention which contain some $Na_2O$.

Glasses containing from 1 to 3 mols of potassium oxide per mole of sodium oxide are preferred. Compositions lying within this range are more workable than compositions lying outside this range, and are easily formed entirely free of any crystalline or other opaque matter which reduces the transparency of glass. As the amount of potassium oxide is decreased below 50 mol percent or increased above 75 mol percent of the total alkali metal oxide content, formation of glass without inclusion of any opaque material becomes increasingly more difficult. Glasses containing about 3 mols of $K_2O$ per mol of $Na_2O$ are the best from the standpoint of workability and high transparency. Furthermore, the range of glass compositions is broader at this ratio than at any other ratio of $K_2O$ to $Na_2O$.

Minor amounts of heavy metal oxides, rarely exceeding 1 percent by weight and frequently much less, about 0.05 to 0.1 percent by weight for example, may be added to the glass according to the present invention to improve the color. Generally these additions impart a color to the glass without affecting the desirable infrared transmission characteristics. In the absence of any coloring oxides, glasses according to this invention are usually transparent and light yellow in color. A possible explanation of this yellow color is the fact that transmission of the longer rays in the visible spectrum exceeds transmission of shorter visible light rays. To impart desired color and to reduce transmission of visible light, various coloring oxides, as for example manganese dioxide and nickelous oxide, can be used.

Ingredients which adversely affect the infrared transmission properties of glass according to the present invention are excluded. Silica and boron trioxide shorten the range of infrared transmission and are not present in amounts exceeding 5 percent by weight for this reason. Preferably they are entirely absent. Lithium compounds are excluded as glass containing lithium is inferior in melting properties and transparency to glass containing no alkali metals except sodium and potassium. preferably glasses of the present invention contain no ingredients except antimony trioxide and possibly higher oxides of antimony, alumina, potassium oxide, sodium oxide, and a small quantity of color-imparting oxide if desired.

Glasses according to the present invention can be made readily by fusing antimony trioxide and alumina with salts of potassium and sodium which decompose at melting temperature leaving no residue except potassium oxide and sodium oxide, respectively. Nitrates and carbonates are examples of such salts. It is advantageous to use potassium nitrate as the source of $K_2O$, since it is desirable to melt the batch in a mildly oxidizing atmosphere. Sodium carbonate is a suitable source of sodium in glasses containing high ratios of $K_2O$ to $Na_2O$. Sodium nitrate is preferable as a source of at least part of the sodium in glasses containing no potassium oxide or a low ratio of potassium oxide to sodium oxide. Carbon dioxide and oxides of nitrogen are volatilized during melting, leaving a melt consisting essentially of antimony oxide, alumina, sodium oxide, and potassium oxide. Whether the antimony oxide is entirely $Sb_2O_3$ or partially higher oxides of antimony is not certain as previously stated, but it is probable that some oxidation of $Sb_2O_3$ takes place. Small amounts of color-imparting oxides, such as manganese dioxide, cobaltous-cobaltic oxide ($Co_3O_4$), and nickel oxide (NiO) are included in the batch where these ingredients are desired in the glass. A dry batch weighing 100 pounds yields a melt weighing on the average about 80 pounds.

Other reagents which furnish the oxides of sodium, potassium, aluminum and antimony may be substituted for the foregoing. For instance, all or part of the antimony may be supplied as a pentavalent compound, such as antimony pentoxide. Sodium aluminate can be used as a replacement for sodium oxide and alumina, and sodium or potassium antimonite may be substituted for sodium or potassium oxide and antimony trioxide. Other replacements of this type will be evident.

Batches are melted by heating to a temperature of about 2400° to 2650° F. The melting temperatures vary within approximately this range, depending on the composition and particularly on the antimony oxide content. In general, the lower the antimony oxide content, the higher the melting temperature. The batch is heated until completely molten and free of bubbles, and then poured.

An oxidizing furnace atmosphere is maintained in the preferred mode of melting, as lack of homogeneity is frequently a characteristic of glass made in a reducing atmosphere. Melting can be conducted in an electric furnace in the pressure of air or in a gas-fired furnace with an oxidizing flame. Use of an oxidizing salt such as potassium nitrate also helps in maintaining an oxidizing atmosphere.

The melting furnace atmosphere should be dry as well as oxidizing to obtain the best transmission characteristics in the glass produced. Glass melted in a substantailly bone-dry atmosphere has a high and virtually constant infrared transmission of wave lengths up to about 6 microns. Quantities of moisture even as small as those amounts normally present in air at room temperature result in a glass which transmits virtually no rays of 3 microns in wave length and has a narrow band on either side in which transmission is substantially impaired. Transmission of rays of other wave lengths outside this band is unaffected by the presence or absence of moisture. A dry atmosphere is most easily obtained in an electric furnace equipped with a drier for the air drawn into the furnace chamber.

The molten glass is rapidly cooled after pouring to a temperature below 1000° F., and is also annealed in a preferred mode of operation. Rapid cooling can be effected by pouring the melt into a mold which has been preheated to a temperature of about 100° to about 1000° F. The glass is cooled until it solidifies. It is desirable to preheat the mold to some extent to avoid wrinkling of the glass adjacent the mold surface as it solidifies.

It is desirable to anneal glass of the present invention to relieve internal stresses. This can be done by placing the solidified glass in an annealing oven maintained at a temperature of 1000° F. or lower, down to about 800° F. The length of time of annealing is not critical, and may be from a minimum of about 2 hours up to much longer times, say at least 24 hours. For example, glasses according to this invention have been satisfactorily annealed in a furnace which was initially at a temperature of about 800° to 1000° F. and gradually cooled over an interval of about 12 to 24 hours to room temperature or slightly higher, about 100° to 125° F.

Glass prepared according to the present invention is transparent to both visible and infrared light and has a yellow tinge. As has been explained, various color-imparting oxides can be present. The glass transmits approximately 55 to 75 percent of the light having wave lengths of 0.5 to 0.7 micron and slightly lower percentages of rays near the violet end of the visible spectrum (0.4 to 0.5 micron). The glass transmits infrared rays having wave lengths up to about 6 microns, and the transmission is relatively high over most of this range. For example, from about 0.7 micron up to about 5 microns, the transmission is very nearly constant at about 65 to 75 percent. The transmission falls gradually at wave lengths from about 5 microns up to about 6 microns, except for diminished transmission at around 3 microns in some cases as previously explained. Glass which has been melted in a dry atmosphere shows substantially the same transmission at 3 microns as at other wave lengths, or at most only slightly lower transmission. Fig. 5 shows the transmission characteristics of a glass melted in a dry atmosphere according to the present invention. This glass has about 53 percent transmission at 3 microns and peak transmission of about 68 percent at 2 to 2.5 microns and again at around 4 microns. Glass which has been melted in a moist atmosphere absorbs virtually all radiation of about 3 microns in wave length.

The refractive index of glass according to the present invention is about 1.69 to about 1.76. Generally the refractive index increases with increasing amounts of $Sb_2O_3$.

Glass according to the present invention is useful in virtually all devices where glass which transmits infrared radiation is required, as for example in pyrometers, bolometers, etc.

To illustrate the present invention further, the following illustrations by way of specific examples are given:

*Example I*

A batch consisting of 6.2 grams of sodium carbonate, 35.6 grams of potassium nitrate, 15.0 grams of alumina, and 65.0 grams of antimony trioxide was mixed, placed in a crucible and introduced into a gas-fired furnace. This batch was calculated to yield a melt of 100 grams having a composition as follows:

| Oxide | Weight Percent | Mol Percent |
| --- | --- | --- |
| $Na_2O$ | 3.5 | 9.4 |
| $K_2O$ | 16.5 | 29.2 |
| $Al_2O_3$ | 15.0 | 24.5 |
| $Sb_2O_3$ | 65.0 | 36.9 |
| | 100.0 | 100.0 |

The batch was heated to 2500° F. for about 30 minutes. The melt was then poured from the crucible onto an iron sheet which was substantially at room temperature. As soon as the glass had solidified on the sheet, it was placed in an annealing oven which initially was at a temperature of 850° F. Shortly after the sheet was placed in the annealing furnace, the heat was turned off and the furnace allowed to cool gradually. After a period of approximately 16 hours, the glass was removed from the annealing furnace, which had cooled to a temperature of about 100° F. to 120° F. A transparent glass having a yellow tint was obtained.

*Example II*

A 20-gram batch of a glass of the composition described in Example I was melted in a glazed porcelain boat in an electrically heated furnace. The furnace was heated to 2500° F., then the boat containing the batch was slowly pushed into the hot zone of the furnace. Air which had been previously dried was then passed into one end of the furnace. The batch was melted in about 15 minutes. The melt was withdrawn from the furnace and poured onto a flat piece of sheet iron. A disk of transparent glass having a slight yellow color approximately ¾ inch in diameter was obtained. This was annealed for approximately 16 hours in a furnace which was initially at a temperature of 850° F. The furnace was allowed to cool to a temperature of about 125° F. at the end of the annealing period.

The annealed sample was ground and polished on both sides and tested for infrared transmission. The results of these tests were as follows:

Wave length, microns:        Percent transmission
    2.0 _____ 66
    2.75 _____ 68
    3.0 _____ 53
    3.25 _____ 60
    3.5 _____ 65
    4.0 _____ 68
    4.5 _____ 64
    5.0 _____ 40
    5.5 _____ 25
    5.75 _____ 10
    6.0 _____ 2

The above infrared transmission data are shown graphically in Fig. 5.

Example III

A charge consisting of 7.7 grams of $Na_2CO_3$, 44.6 grams of $KNO_3$, 20.0 grams of $Al_2O_3$, and 55.0 grams of $Sb_2O_3$ was placed in a porcelain crucible and placed in a gas-fired furnace. The batch was calculated to yield the following amounts of oxides:

| Oxide | Weight Percent | Mol Percent |
|---|---|---|
| $Na_2O$ | 4.5 | 10.8 |
| $K_2O$ | 20.5 | 32.4 |
| $Al_2O_3$ | 20.0 | 28.8 |
| $Sb_2O_3$ | 55.0 | 28.0 |

The charge was melted, and was observed to boil at 2450° F. The charge was poured and was completely devitrified. The charge was then reheated to 2550° F. and poured. The second melt was entirely glass with no crystalline phase, and was mostly colorless except for a whitish top surface.

Example IV

A charge consisting of 3.8 grams of sodium carbonate, 27.8 grams of potassium nitrate, 10.0 grams of alumina, and 75.0 grams of antimony trioxide was mixed, placed in a crucible, and introduced into a gas-fired furnace. The charge was calculated to yield a melt weighing 100 grams and having the following composition:

| Oxide | Weight Percent | Mol Percent |
|---|---|---|
| $Na_2O$ | 2.2 | 6.7 |
| $K_2O$ | 12.8 | 25.9 |
| $Al_2O_3$ | 10.0 | 18.7 |
| $Sb_2O_3$ | 75.0 | 48.7 |

The charge was placed in a porcelain crucible and introduced into a gas-fired furnace. It was melted over a period of about 30 minutes and was observed to boil rapidly at 2450° F. The batch was heated until a temperature of 2520° F. was reached, at which time the batch was still bubbling actively at the edges. The sample was then poured into an iron mold, placed in an annealing furnace which was initially at a temperature of about 900° F., and annealed for a period of about 16 hours while the furnace was gradually cooled. The furnace was at a temperature of about 100° F. to 125° F. when the annealed sample was removed. The annealed sample was a very clear glass.

Example V

A charge consisting of 6.2 grams of sodium carbonate, 35.6 grams of potassium nitrate, 11.9 grams of alumina, 68.1 grams of antimony trioxide was prepared. This charge was calculated to give a melt weighing 100 grams and having the following composition:

| Oxide | Weight Percent | Mol Percent |
|---|---|---|
| $Na_2O$ | 3.6 | 10 |
| $K_2O$ | 16.4 | 30 |
| $Al_2O_3$ | 11.9 | 20 |
| $Sb_2O_3$ | 68.1 | 40 |

The charge was placed in a porcelain crucible and introduced into a gas-fired furnace, where it was heated to 2570° F. At this temperature, the glass was completely melted with no evidence of devitrified material. Active bubbling of the melt was observed at 2450° F. The glass was poured, and a clear, transparent glass, with a slight yellow tint was obtained.

Example VI

A charge consisting of 12.7 grams of sodium carbonate, 24.3 grams of potassium nitrate, 12.1 grams of alumina, and 69.3 grams of antimony trioxide was prepared. This charge was calculated to give a melt weighing 100 grams and having the following composition:

| Oxide | Weight Percent | Mol Percent |
|---|---|---|
| $Na_2O$ | 7.4 | 20 |
| $K_2O$ | 11.2 | 20 |
| $Al_2O_3$ | 12.1 | 20 |
| $Sb_2O_3$ | 69.3 | 40 |

The charge was placed in a gas-fired furnace. The melt was heated over a period of about 30 minutes, and became very fluid with active boiling at about 2500° F. The melt was then poured. As the glass cooled it broke into small pieces. A few crystals were observed in some of the pieces, but most of the glass pieces were clear and transparent.

Example VII

A batch consisting of 19.3 grams of sodium carbonate, 12.4 grams potassium nitrate, 12.3 grams of alumina, and 70.8 grams of antimony trioxide was prepared. The total of the batch was 114.8 grams, and was calculated to yield a melt weighing 100 grams and having the following composition:

| Oxide | Weight Percent | Mol Percent |
|---|---|---|
| $Na_2O$ | 11.2 | 30 |
| $K_2O$ | 5.7 | 10 |
| $Al_2O_3$ | 12.3 | 20 |
| $Sb_2O_3$ | 70.8 | 40 |

A 50-gram portion of the batch was placed in a glazed crucible, introduced into a gas-fired furnace, and melted. The batch appeared somewhat refractory but melted completely at about 2500° F. The melt was heated to 2550° F. and the glass was poured. A transparent, light yellow-tinted glass with a few inclusions of opaque material was obtained.

Example VIII

A batch of 26.3 grams of sodium carbonate, 12.6 grams of alumina, and 72 grams of antimony trioxide was prepared. This batch was calculated to yield a melt weighing 100 grams and having the following composition in terms of the oxides present:

| Oxide | Weight Percent | Mol Percent |
|---|---|---|
| $Na_2O$ | 15.4 | 40 |
| $Al_2O_3$ | 12.6 | 20 |
| $Sb_2O_3$ | 72.1 | 40 |

The batch was placed in a crucible and charged to a furnace and melted in about 30 minutes. The melt was heated to 2350° F. and poured onto an iron sheet to form two disks on flat pieces of iron. The disks were placed in an annealing oven which was initially at a temperature 750° F., and cooled for a period of about 16 hours. At the end of this time the oven temperature was about 100° F.

The first disk poured was a clear, amber glass except for a whitish skin on top and some opaque inclusions. The second disk was partially devitrified and contained many inclusions.

Glass prepared according to this example was observed to be water soluble to an appreciable extent. Freshly broken edges of samples of the glass etched quite rapidly and the surfaces became flaked from the dissolved alkali.

Various modifications in the present invention can be made by those skilled in the art without departing from the scope thereof. The present invention shall be limited in scope only by the appending claims.

What is claimed is:

1. A transparent glass composition consisting essentially of antimony oxide, alumina, and at least one material selected from the group consisting of sodium oxide and potassium oxide; in relative amounts lying within the areas $A_1$, $A_2$, $A_3$, and $A_4$ designated in Figs. 1 to 4 inclusive of the accompanying drawing.

2. A transparent glass composition consisting essentially of antimony oxide, alumina, and sodium oxide and potassium oxide in approximately the molar ratio 1 to 3, in relative amounts lying within the area designated $A_2$ in Fig. 2 of the accompanying drawing.

3. A transparent glass composition consisting essentially of antimony oxide, alumina, and at least one material selected from the group consisting of sodium oxide and potassium oxide; in relative proportions lying within the range designated by the areas $A_1$, $A_2$, $A_3$, and $A_4$ as shown in Figs. 1 to 4 inclusive of the accompanying drawing and interpolations with varying $R_2O$ therebetween.

4. A process of producing an antimony oxide glass which comprises melting antimony trioxide, alumina, and at least one decomposable compound which yields an alkali metal oxide selected from the group consisting of sodium oxide and potassium oxide, in an oxidizing atmosphere in proportions such that the resulting melt consists essentially of antimony oxide, alumina, and at least one material selected from the group consisting of sodium oxide and potassium oxide, in relative proportions lying within the range designated by the areas $A_1$, $A_2$, $A_3$, and $A_4$ of Figs. 1 to 4 inclusive of the accompanying drawings, and interpolations with varying $R_2O$ therebetween.

5. A process of producing an antimony oxide glass which comprises melting antimony trioxide, alumina, a decomposable compound which yields sodium oxide, and a decomposable compound which yields potassium oxide, in an oxidizing atmosphere in proportions such that the resulting melt consists essentially of antimony oxide, alumina, sodium oxide, and potassium oxide in relative proportions lying within the range designated by the area $A_2$ of Fig. 2 of the accompanying drawings.

6. A process of producing an antimony oxide glass which comprises melting compounds yielding a melt consisting essentially of antimony oxide, alumina, and at least one alkali metal oxide selected from the group consisting of sodium oxide and potassium oxide, the proportions of reagents being such that the melt consists essentially of antimony oxide, alumina, and at least one alkali metal oxide selected from the group consisting of sodium oxide and potassium oxide, in relative proportions lying within the range designated by the areas $A_1$, $A_2$, $A_3$, and $A_4$ in Figs. 1 to 4 inclusive of the accompanying drawings and interpolations with varying $R_2O$ therebetween.

7. A transparent glass composition consisting essentially of about 25 to 55 mol percent of antimony oxide, about 13 to 30 mol percent of $Al_2O_3$, and about 27 to 45 mol percent $R_2O$, where $R_2O$ is chosen from the group consisting of $Na_2O$, $K_2O$, and mixtures thereof, said glass containing not more than about 5 percent by weight of boron trioxide and silica and transmitting at least about 50 percent of infrared rays of wave lengths of less than about 5 microns.

8. A transparent glass composition consisting essentially of about 25 to 55 mol percent of antimony oxide, about 13 to 30 mol percent of alumina, and a sum total of about 27 to 45 mol percent of sodium oxide and potassium oxide, the mol ratio of potassium oxide to sodium oxide being about 3 to 1.

References Cited in the file of this patent

Eitel et al.: Glastechnische Tabellen (1932), pp. 706–707.